Figure 1A:
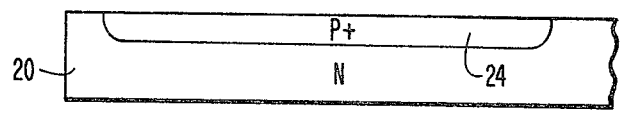

United States Patent [19]

Petersen

[11] 4,332,000

[45] May 25, 1982

[54] CAPACITIVE PRESSURE TRANSDUCER

[75] Inventor: Kurt E. Petersen, San Jose, Calif.

[73] Assignee: International Business Machines Corporation, Armonk, N.Y.

[21] Appl. No.: 193,860

[22] Filed: Oct. 3, 1980

[51] Int. Cl.³ .............................................. H01G 7/00
[52] U.S. Cl. ..................................... 361/283; 357/26; 361/278
[58] Field of Search ................. 73/724, 718; 361/283, 361/278; 357/26

[56] References Cited

U.S. PATENT DOCUMENTS

| | | | |
|---|---|---|---|
| 3,328,653 | 6/1967 | Wolf | 317/246 |
| 3,634,727 | 1/1972 | Polye | 361/283 X |
| 3,748,571 | 7/1973 | Kurtz | 361/283 X |
| 3,758,830 | 9/1973 | Jackson | 317/234 |
| 3,853,650 | 12/1974 | Hartlaub | 156/13 |
| 3,938,175 | 2/1976 | Jaffe et al. | 357/26 |
| 3,994,009 | 11/1976 | Hartlaub | 29/580 |
| 4,003,127 | 1/1977 | Jaffe et al. | 357/26 |
| 4,021,766 | 5/1977 | Aine | 338/2 |
| 4,064,550 | 12/1977 | Dias | 361/283 |
| 4,261,086 | 4/1981 | Giachino | 361/283 X |

Primary Examiner—Elliot A. Goldberg
Attorney, Agent, or Firm—George E. Roush

[57] ABSTRACT

An integrated semiconductor pressure transducer comprises a central conducting diaphragm located between two frusto-pyramidal recesses defined by contiguous semiconductor body members of conductivity type different from that of the diaphragm. A metal membrane with communicating apertures subtends one cavity and forms a relatively fixed plate of a capacitor, the other plate of which is formed by the diaphragm. A method of making the transducer in semiconductor process steps includes provisions for normal integrated circuit device fabrication whereby a transducer and utilization circuitry are fabricated in the same process into a single integrated semiconductor device.

6 Claims, 7 Drawing Figures

CAPACITIVE PRESSURE TRANSDUCER

FIELD

The invention relates to sensitive pressure transducers, and it particularly pertains to capacitive transducers fabricated from semiconductor materials and a method for fabricating such transducers.

BACKGROUND

Numerous pressure sensing transducers are available to the artisan. The widespread use of integrated circuitry has met with less than satisfactory pressure transducers for use in integrated circuits. Thus there is a need for a pressure transducer that is readily integrable with Metal Oxide Silicon (MOS) circuitry. Prior art piezoresistive pressure sensitive devices have been tried, but have not provided the substantially necessary amplitude of signal for ready detection and processing. Their sensitivity to ambient temperature variations has been a problem. In addition, the fabrication of these transducers has been critical and difficult to control.

SUMMARY

In accordance with the invention, a pressure transducer is made of semiconductor material in known semiconductor material fabrication operations, whereby it may be fabricated in an integrated circuit in the same process that the circuitry utilizing the transducer is made. The pressure transducer is a capacitive type comprising two parallel plate members integrably fabricated on the same substrate.

A substrate and an epitaxial superstrate encompassing a buried layer, are etched to form cavities on either side of that layer, and to bare a diaphragm portion of that layer which forms one capacitor plate. A metalized membrane having apertures therein is arranged over one cavity to form the other capacitor plate. The capacitor is variable due to flexing the diaphragm portion by a source of pressure to be monitored.

The pressure transducer according to the invention is fabricated by developing a buried p+ layer, or the opposite, in a block of n-silicon, or the opposite; depositing an insulating layer on both sides; metalizing the obverse insulating layer; etching apertures through the metalization and the insulating layer; and etching a single aperture encompassing the apertures in the obverse; after which a selective etchant is applied to both sides for opening a large recess defined in part by the single aperture, and for opening a similar recess between the buried layer and the metalized insulating layer. The latter is taut and forms the stator of the capacitor while the formerly buried layer has an exposed diaphragm portion which forms the rotor of the capacitor.

PRIOR ART

Pertinent state-of-the-art prior to the invention is determinable on reference to the following U.S. Pat. Nos.:

| | | | |
|---|---|---|---|
| 3,328,653 | 6/1967 | Wolf | 317/246 |
| 3,758,830 | 9/1973 | Jackson | 317/234 |
| 3,853,650 | 12/1974 | Hartlaub | 156/13 |
| 3,938,175 | 2/1976 | Jaffe et al | 357/26 |
| 3,994,009 | 11/1976 | Hartlaub | 29/580 |
| 4,003,127 | 1/1977 | Jaffe et al | 357/26 |
| 4,021,766 | 5/1977 | Aine | 338/2 |

The patent to Wolf discloses a capacitive pressure transducer having pertinence only in that cavities arranged in one electrode contain air which is compressed due to pressure on the other electrode through the dielectric spacer, the latter two being flexible to suit the purpose.

Jackson discloses a strain gauge made of semiconductor material. A thin web of single crystal silicon is deflected by the object under test. This deflection is sensed by thermocouple action within the semiconductor structure.

The patents to Hartlaub disclose peizoelectric strain transducers otherwise having structural elements in common and made of semiconductor material in process steps in common with integrated circuit processing. Likewise, the patents to Jaffe and Seto disclose polycrystalline silicon pressure transducers having structural elements in common and made of semiconductor materials in process steps that individually are common in the industry. The specific structure and process according to the invention are different, however.

The patent to Aine relates to a pressure transducer of semiconductor material, but is directed to a leaf spring type of transducer which, except for a flexible monocrystalline component, is unlike the pressure transducer according to the invention.

DRAWING

Figure 1B:
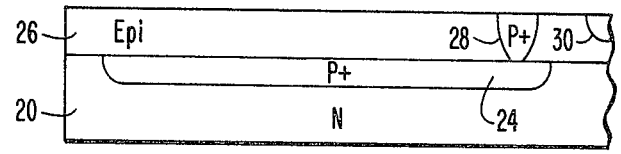
Figure 1C:
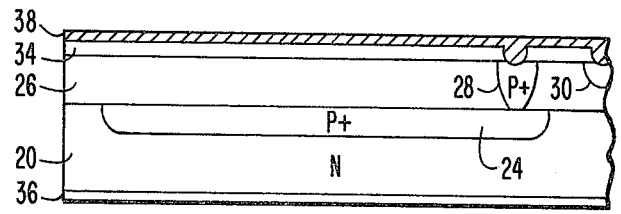
Figure 1D:
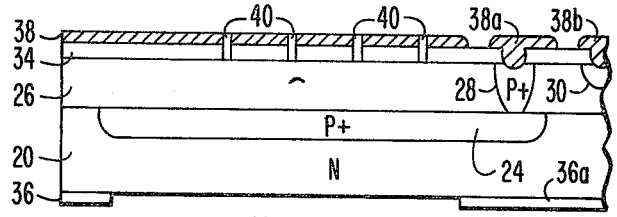
Figure 1E:
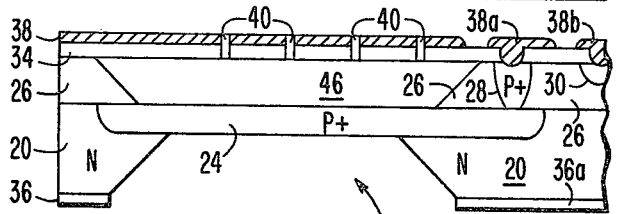
Figure 1F:
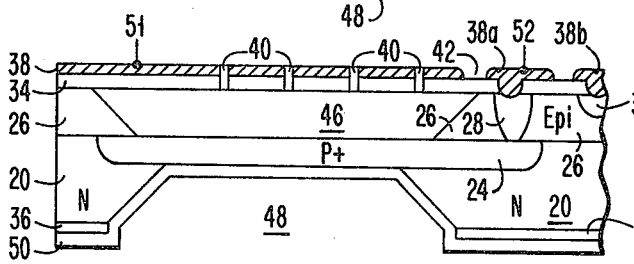
Figure 2:
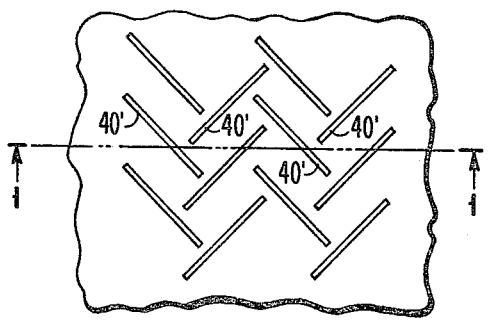

In order that the advantages of the invention obtain in practice, the best mode embodiment thereof, given by way of example only, is described in detail hereinafter with reference to the accompanying drawing forming a part of the specification, and in which:

FIGS. 1A through 1F are cross-section schematic diagrams illustrating a pressure transducer according to the invention as it evolves from a fabrication process according to the invention; and FIG. 2 is a portion of a plan view of the pressure transducer according to the invention.

DESCRIPTION

It is contemplated that the pressure transducer according to the invention be made not only as a unitary device, but preferably as a part of an integrated circuit structure, the circuitry of which utilizes the variation in capacitance of the transducer in operation. The transducer is therefore contemplated as an integrated structure resulting from the process described hereinafter.

In this process, an initial step, usually performed by a vendor, is the production of a semiconductor wafer or substrate 20 in FIG. 1A, with the major surfaces lying substantially in the (100) plane. The semiconductor crystalline structure then has internal (111) planes at a convenient angle with respect to the (100) planes, for example, in crystalline silicon, at an angle of 54°7. The reason for this will become more apparent as the specification progresses, but at this time it is helpful to understand that if a suitable anisotropic etchant is used, pyramidal cavities can be etched in the semiconductor substrate 20. An anisotropic etchant works much more normally to the (100) plane than it does laterally or parallel to the (100) plane and thus it works very much less at the (111) plane. Hence, the action of the etchant leaves pyramidal surfaces. In accordance with the process according to the invention, the substrate 20 shown here as n-type silicon with the upper and lower surfaces lying in the (100) plane, is heavily doped, with boron for example, in the region or area where the pressure transducer is eventually to be located, resulting in a diffused layer 24 of p+ material. Next, an epitaxial layer 26 is grown over the substrate 20 and the layer 24 as shown in FIG. 1B whereby the latter becomes a typical buried layer 24.

At this instant in time the structure is ready for processing according to conventional methods for integrating circuitry. One of the circuit connections laid down at this time is an electric connection 28 for bringing the p+ buried layer 24 out to the upper surface of the epitaxial layer 26, by diffusing p+ material as shown outside the area of the transducer and at a point convenient to the integrated circuitry utilizing the transducer. An element 30 of integrated circuitry is suggested. Those skilled in the art will proceed in known manner.

As shown in FIG. 1C, the structure has a layer 34 and another layer 36 of insulating material, preferably silicon nitride ($Si_3N_4$) deposited to a depth on the order of 5000 Å on the obverse and the reverse and over the obverse layer a metalization layer 38 is deposited. During this same step, metalization deposits 38a and 38b are laid for the integrated circuit connections.

As shown in FIG. 1D, the structure is next etched on the reverse to remove the insulating material 36a. Preferably this material is etched away in a large square encompassing the limits of the transducer to come; alternately, it could be circular, rectangular, oval and such shaped. Apertures 40 are etched through the metalization layer 38 and the insulating layer 34 on the obverse. These apertures preferably are slit as shown in the plan view of FIG. 2. The holes as seen in FIG. 1D are shown as viewed along the chain line 1—1 in FIG. 2. Alternately these holes can be circular, square and such in shape.

The structure is then subjected to an etchant, preferably an anisotropic etchant for example an anisotropic etchant ethylene diamine and pyrcatechol (known by the acronym EDP), which reacts only with the silicon and etches away that material on both sides of the (formerly) buried layer 24 to leave a portion of it as a diaphragm between two frusto-pyramidal cavities 46 and 48 having lateral surfaces in the (111) planes. The insulating silicon nitride layers are in tension when deposited on silicon. Therefore the metalized insulating membrane 38-34 over the cavity 46 is taut and relatively large windows (1 mm×1 mm) are possible.

A passivating layer 50 is coated on the reverse of the structure as shown in FIG. 1E; glass is suitable for some applications, but tough yet yielding plastic material is used where glass is too brittle to serve. Electric leads 51 and 52 are added in form suitable for the application.

The diaphragm portion of the layer 24 and the metallic layer 38 form a capacitor which is variable due to the flexibility of the diaphragm portion. Reference pressure enters the apertures 40 to the cavity 46, and the cavity 48 is coupled to the source of pressure to be measured. For example, the obverse, or circuit side of the structure is packaged in an evacuated header, and the atmospheric pressure on the reverse of the structure in cavity 48 will cause the diaphragm 24 to deform and change the value of the capacitor, which change is then sensed by the arrangement of the "on chip" circuitry.

While the invention has been described in terms of an express embodiment, and alternatives have been suggested, it is clearly to be understood that those skilled in the art will effect further changes without departing from the spirit and the scope of the invention as defined in the appended claims.

The invention claimed is:

1. A capacitive pressure transducer comprising
a unitary semiconductor device structure having a relatively flexible central diaphragm portion of enhanced semiconductor material of one conductivity type material and having contiguous diaphragm holding portions of semiconductor material of the opposite conductivity type arranged on opposite sides of said diaphragm portion and having apertures therein also disposed on opposite sides of and extending to said diaphragm portion,
an electric connecting lead from said diaphragm portion to the external side of one of said holding portions,
a metal layer arranged on the external side of said one holding portion over the aperture therein, forming a hollow cavity thereby, and having a plurality of apertures in said metal layer communicating with said hollow cavity,
said metal layer and said diaphragm portion forming a capacitor of variable capacitance due to the flexibility of said diaphragm portion, and
provisions adapting said capacitor for connection into an electric circuit for indicating relative pressure on opposite sides of said diaphragm portion in response to the change of capacitance.

2. A capacitive pressure transducer comprising
a unitary semiconductor device structure having a relatively flexible central diaphragm portion of enhanced semiconductor material of one conductivity type silicon material and having contiguous diaphragm silicon holding portions of semiconductor material of the opposite conductivity type arranged on opposite sides of said diaphragm portion and having frusto-pyramidal apertures therein also disposed on opposite sides of and extending to said diaphragm portion,
an electric connecting lead from said diaphragm portion to the external side of one of said holding portions,
an insulating layer arranged over said one side of said holding portion,
a metal layer arranged over said insulating layer on the external side of said one holding portion over the frusto-pyramidal aperture therein, forming a hollow cavity thereby, and having a plurality of relatively smaller apertures in said metal layer communicating with said hollow frusto-pyramidal cavity.
said metal layer and said diaphragm portion forming a capacitor of variable capacitance due to the flexibility of said diaphragm portion, and
electric leads connected to said capacitor portions for connection into an electric circuit for indicating relative pressure on opposite sides of said diaphragm portion in response to the change of capacitance.

3. A capacitive pressure transducer comprising
a unitary semiconductor device structure having a pair of body portions of semiconductor material of one conductivity type, each having a frusto-pyramidal aperture therein, a relatively flexible central diaphragm portion of enhanced semiconductor material of opposite conductivity type, said body portions being arranged on opposite sides of said diaphragm portion, an electric connecting lead from said diaphragm portion to the external side of one of said body portions, a metal layer arranged on the external side of said one body portion over the aperture therein, forming a hollow cavity thereby, and having a plurality of smaller apertures in said metal layer communicating with said hollow cavity, said metal layer and said diaphragm portion forming a capacitor of variable capacitance due to the flexibility of said diaphragm portion, and provisions adapting said capacitor for connection into an electric circuit for indicating relative pressure on opposite sides of said diaphragm portion in response to the change of capacitance.

4. A capacitive pressure transducer as defined in claim 1 and wherein said diaphragm portion is of p+ type semiconductor material, and said holding portions are of n type semiconductor material.

5. A capacitive pressure transducer as defined in claim 2, and wherein said holding portions are comprised of monocrystalline silicon and is oriented with the (100) plane parallel to the plane of said diaphragm portions.

6. A capacitive pressure transducer comprising a unitary semiconductor device sandwich structure having a holding layer portion of semiconductor material of one conductivity type having a central aperture therein, a diaphragm layer portion of enhanced semiconductor material of conductivity type opposite to said one conductivity type and arranged over said holding layer portion, another holding layer portion of semiconductor material of said one conductivity type having a central aperture therein arranged on the other side of said diaphragm layer portion and having the aperture in alignment with the aperture of the first said holding layer portion, an insulating layer portion arranged over said other holding layer portion and having at least one aperture therein communicating with the central aperture of said other holding layer portion, and a metal layer portion arranged over said insulating layer portion and having apertures communicating with said central aperture of said other holding layer portion, said metal layer and said diaphragm layer portions forming a capacitor of variable capacitance due to the flexibility of said diaphragm layer portion, and an electric connecting lead from said diaphragm layer portion to an external side of structure for connection into an electric circuit along with an elective connection to said metal layer portion for indicating relative pressure on opposite sides of said diaphragm layer portion in response to change of capacitance.

* * * * *